United States Patent
van der Schoot et al.

[11] Patent Number: 5,167,317
[45] Date of Patent: Dec. 1, 1992

[54] APPARATUS FOR AND METHOD OF TRANSFERRING ARTICLES SUCH AS EGGS

[75] Inventors: Jelle van der Schoot, Aalten; Willem C. M. Arends, Doetinchem, both of Netherlands

[73] Assignee: FPS Food Processing Systems B.V., Netherlands

[21] Appl. No.: 710,443

[22] Filed: Jun. 5, 1991

[51] Int. Cl.⁵ .............................................. B65G 29/00
[52] U.S. Cl. .............................. 198/469.1; 198/699.1; 209/510; 209/925
[58] Field of Search ...................... 198/365, 370, 699.1, 198/469.1, 478.1, 418.6; 209/510, 925

[56] References Cited

U.S. PATENT DOCUMENTS

| | | | |
|---|---|---|---|
| 3,272,309 | 9/1966 | Reading | 198/723 X |
| 3,743,079 | 7/1973 | Siciliano | 198/698 X |
| 4,519,494 | 5/1985 | McEvoy et al. | 198/432 X |
| 4,776,465 | 10/1988 | McEvoy et al. | 209/510 |
| 4,836,355 | 6/1989 | Blanc | 198/418.6 |

FOREIGN PATENT DOCUMENTS 1031334 6/1966 United Kingdom.

Primary Examiner—Robert P. Olszewski
Assistant Examiner—Cheryl L. Gastineau
Attorney, Agent, or Firm—Larson and Taylor

[57] ABSTRACT

A method and apparatus for transferring discrete articles such as eggs or fruit from a conveyor having at least one row of article holders to a receiver having a resilient upwardly facing portion which then carries the articles generally horizontally to a receiving station. The upwardly facing portion has a resilient structure including for example brush bristles or an air bellows.

18 Claims, 2 Drawing Sheets

APPARATUS FOR AND METHOD OF TRANSFERRING ARTICLES SUCH AS EGGS

This invention relates to an apparatus for receiving eggs conveyed by and released from gripper conveyors. Such an apparatus is known from U.S. Pat. No. 4,519,494, which comprises one rotating brush or two brushes rotating in opposite directions, the successive eggs being received in the gap between the brush and a flexible slab or between said two brushes, to be subsequently passed down, where via a sliding plate arranged obliquely under one of the brushes, they are discharged laterally by means of a known per se conveyor.

In this known apparatus use is made of a plurality of supply conveyors arranged side by side, so that care must be taken that the eggs are not released simultaneously, since otherwise the eggs will collide and be damaged.

Another drawback of the known apparatus is that the eggs will drop over a comparatively high vertical distance, which causes high speeds and, as a consequence thereof, greater decelerating forces so that more damage may occur.

Further, the articles make a deep impression in the outer layer of the brushes, so that brushes with long hairs and/or of thick soft resilient material will be required, i.e. brushes of comparatively great diameter, so that a high degree of contamination can be expected in case of breakage.

It is an object of this invention to provide an apparatus for receiving eggs from a plurality of gripper conveyors arranged side by side, which does not have the inherent disadvantages mentioned.

To that effect, an apparatus for transferring articles such as eggs or fruit conveyed in spaced-apart, aligned relationship by conveyor means to a receiving station in a grading or packaging machine, comprising: conveyor means comprising one or more parallel row(s) of article carrying and releasing means for conveying and delivering a plurality of articles in spaced-apart relationship to the receiving station; driven resilient receiving means disposed adjacent and at about the same level as the supply end of said receiving station and below said conveyor means, as known from U.S. Pat. No. 4,519,494 is characterized according to the invention in that the top of the resilient receiving means is arranged in such a way that said receiving means has a resilient structure which resiliently receives the articles at the top, i.e., an upwardly facing portion thereof, the resilient receiving means being designed with a laterally engaging structure to move the articles laterally and preferably horizontally engage sides of the articles to assure movement of the articles along with the receiving means to the supply end of the discharge conveyor.

Preferably said driven resilient receiving means comprise rotatable cylindrical brush means.

In another embodiment the resilient receiving means comprise a plurality of flat brushes fixed to an endless belt or chain. Further, the brushes may be of interrupted configuration so as to form pockets, each being adapted for transporting one article or a row of articles.

In a further embodiment the brushes have different lengths of hair to prevent the article from sinking too deeply into the brushes.

It is also possible that a plurality of spaced-apart disks form a number of channels for receiving said articles.

It is also possible that the resilient receiving means comprise rotatable cylindrical air bellows.

The invention further relates to a method of transferring articles such as eggs or fruit, delivered in spaced-apart relationship by conveyor means to a receiving station, comprising the steps of:

delivering articles to said receiving station in parallel spaced-apart rows of said conveyor means;

releasing articles from said conveyor means at the receiving station according to a grading and packaging program.

According to the invention, this method is characterized by arranging receiving means substantially below said conveying means for receiving at the top thereof said released articles simultaneously from both said parallel spaced-apart rows of eggs;

moving them substantially horizontally to said receiving station, said receiving station being arranged at about the same level as said top of said receiving means.

The receiving means may comprise rotatable cylindrical brush means.

Alternatively, the receiving means may comprise a plurality of flat brushes fixed to an endless belt or chain.

For the sake of completeness reference is made to British Patent No. 1,031,334 and U.S. Pat. No. 3,743,079, both of which describe and show apparatuses for transportation of eggs along a vertical or near-vertical line and in which there is used a rotating brush or similar belt, which in the transportation part co-operates with a fixed guiding wall. In this known apparatus, however, no mention is made of conveying means with egg carrying and releasing means, nor of resilient receiving means disposed below said conveying means, nor is any mention made of using the top of the receiving means for moving the articles sideways.

These and other novel features and advantages of the invention will be described in greater detail in the following description, in which.

Figure 1:
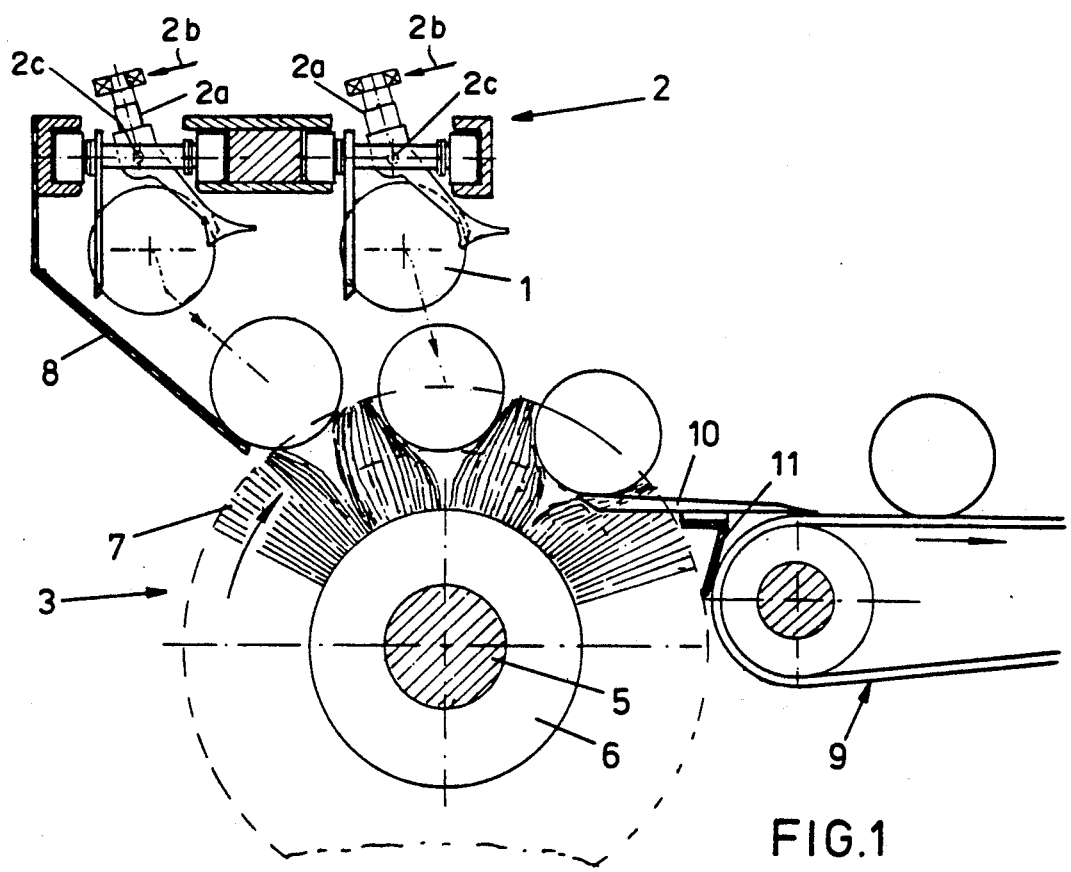
FIG. 1 shows a schematic sideview of a part of an apparatus for transferring articles from conveyor means to a receiving station of a grading or packaging machine.

According to FIG. 1, the articles, in this case eggs 1, are supplied by means of a supply conveyor 2, which carries the articles in a direction perpendicular to the plane of the drawing, releasing such articles when the upper parts 2a of the holding members are moved to the left as indicated by the arrow 2b, pivoting the lower parts of the members 2 to the right, about pivot axes 2c.

The brush 3 consists in known manner of a multiplicity of brush elements. The eggs 1 can be released simultaneously from the separate carriers of the conveyor 2 at the point where they drop, falling in slightly spaced-apart relationship onto and between the hairs of the brushes 3 each consisting essentially of a shaft 5 having provided thereon a hub 6 with brush hairs 7 arranged therein.

As will appear from FIG. 1, upon simultaneous release of the eggs 1, they will be received between the brush hairs 7 in slightly spaced-apart relationship, the left-most egg reaches the brush 3 at the top thereof via a plate 8 coated with a resilient material.

Adjacent the brush 3 a known per se discharge conveyor 9 is arranged.

In order to ensure a proper transfer from the brush 3 to the discharge conveyor 9, a transfer 10 is arranged, consisting of separate fingers, which together are fixed on a support strip 11 which is part of a frame (not shown). As will appear from FIG. 1, these fingers extend between the hairs 7 of the brush 3, to such an extent that the articles, eggs 1 in this case, are discharged essentially horizontally via the strip 10 to the conveyor 9.

Figure 2:
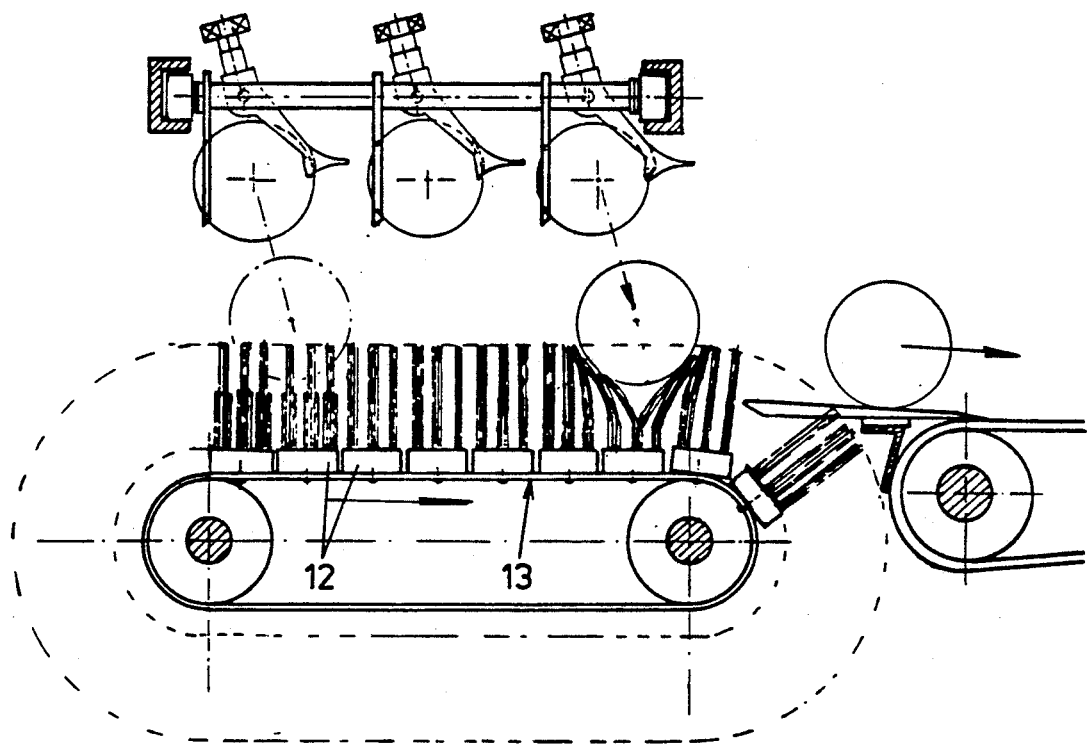
FIG. 2 shows the same view of another embodiment of the apparatus according to the invention.

In the embodiment shown in FIG. 2, the brush 3 consists of a plurality of flat brushes 12 mounted on an endless belt or chain 13. Since for the rest the apparatus corresponds completely with the apparatus described with reference to FIG. 1, it will not be further described here.

Figure 3:
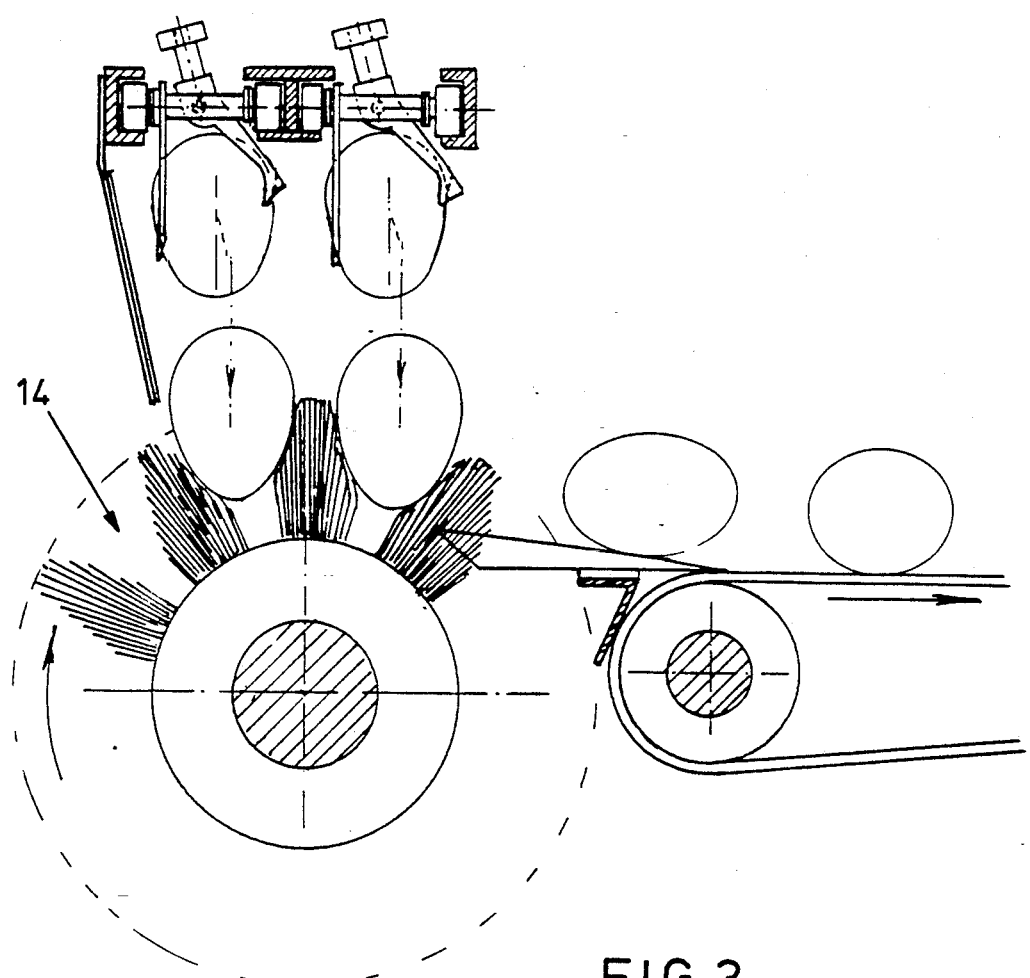
FIG. 3 is a view according to FIGS. 1 and 2 of a third embodiment of the apparatus according to the invention.

The apparatus as shown in FIG. 3 is a variant of the apparatus according to FIG. 1, in which the brush is designed such that it forms a plurality of pockets 14 in which the articles, eggs 1 in this case, can be received.

Figure 4:
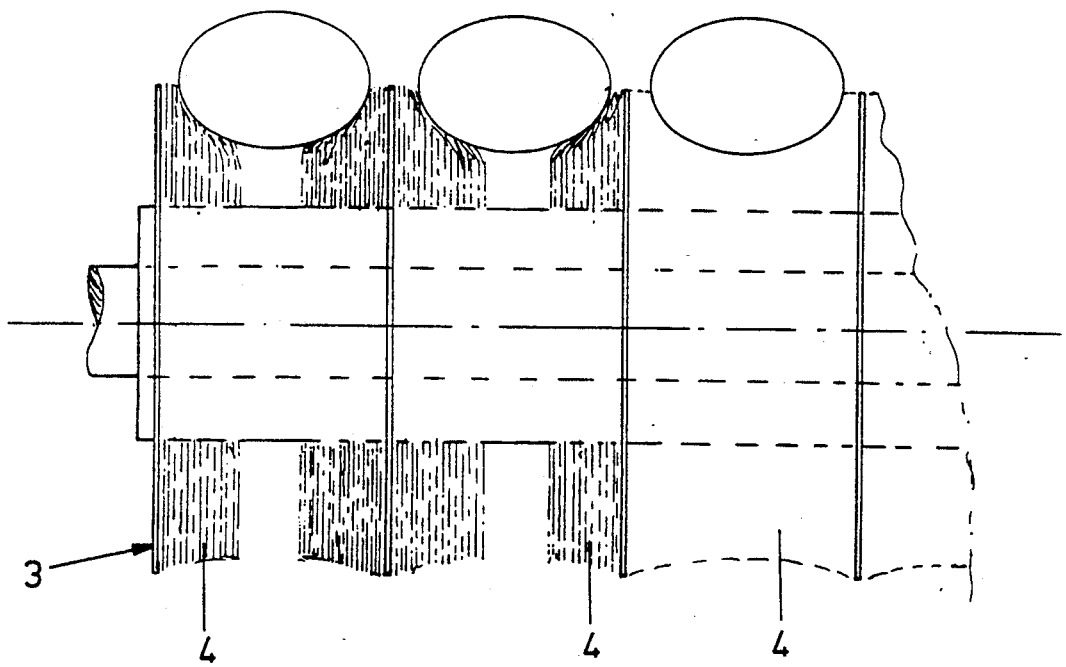
FIG. 4 is a partial sideview of a brush with flexible disks arranged to form channels and to protect the products from each other.

Similarly, FIG. 4 shows a variant in which the brush comprises a plurality of flat resilient disks which form a plurality of channels which offer additional protection from mutual collision, the hairs being arranged in such a way that channels are formed in them in which the articles can be received softly without them touching each other during receiving or transporting.

Although no embodiment to that effect is shown here, it is also possible for the purpose of receiving the eggs, to use round rotatable air bellows having a profile that approximately corresponds with the shape of the brushes already shown.

After the foregoing, it will be clear that a great number of modifications are conceivable within the framework of the concept of the invention.

I claim:

1. An apparatus for transferring discrete articles, comprising:
a conveyor having at least one row of article holders for conveying articles which are spaced apart from each other in the direction of travel of the conveyor,
a resilient receiving means having an upwardly facing portion positioned beneath the conveyor for receiving articles dropped from the conveyor, the upwardly facing portion of the receiving means being moveable transversely, relative to the direction of the movement of the conveyor, in a generally horizontal direction, said upwardly facing portion having a resilient structure for resiliently receiving the articles which are dropped from the conveyor and a lateral engaging structure for engaging the sides of the articles to assure movement of the articles along with the receiving means,
and a receiving station positioned adjacent said upwardly facing portion of the receiving means downstream from the location where the articles are dropped thereon,
whereby articles delivered from the conveyor drop onto the upwardly facing portion of the receiving means, which then moves the articles therealong in a generally horizontal direction to the receiving station.

2. An apparatus according to claim 1, wherein the upwardly facing portion is long enough, in its direction of travel, to receive at least two articles, such that a plurality of articles carried by the conveyor, side by side, can be dropped simultaneously onto the upwardly facing portion of the receiving means.

3. An apparatus according to claim 1, wherein the upwardly facing portion comprises brush bristles which form the resilient structure as well as the lateral engaging structure, as the articles fall into the bristles.

4. An apparatus according to claim 3, wherein the receiving means is a cylindrical brush, the curved uppermost portion of which comprises said upwardly facing portion.

5. An apparatus according to claim 3, wherein the receiving means comprises an endless conveyor having a generally straight upper run which forms said upwardly facing portion.

6. An apparatus according to claim 5, wherein the resilient structure and the lateral engaging structure are formed by a plurality of discrete brushes which are connected side by side to the endless conveyor, such that the bristles of the discrete brushes are side by side with the bristles essentially parallel to each other when traveling along the generally straight upper run of the endless conveyor, but are capable of separating from each other at turns at the ends of the endless conveyor.

7. An apparatus according the claim 3, wherein the brush bristles are interrupted to form pockets, each pocket adapted for receiving an article or a row of articles.

8. An apparatus according to claim 3, wherein the bristles are of differing lengths to prevent the articles from sinking too deep into the brush bristles.

9. An apparatus according the claim 3, wherein the upwardly facing portion forms a plurality of channels, arranged side by side in the direction of travel of the conveyor, and rigid disc structures separating the respective channels from each other.

10. An apparatus according to claim 1, wherein the receiving means is cylindrical, the curved uppermost portion of which forms the said upwardly facing portion.

11. An apparatus according to claim 1, wherein the receiving means is an endless conveyor having a generally straight upper run which forms said upwardly facing portion.

12. An apparatus according to claim 1, wherein the upwardly facing portion forms a plurality of channels, arranged side by side in the direction of travel of the conveyor, and rigid disc structures separating the respective channels from each other.

13. An apparatus for transferring eggs, comprising:
an article conveyor having at least one row of egg holders for conveying eggs in a row, spaced apart from each other from the direction of travel of the conveyor,
a resilient receiving means comprising an endless surface and mounted for movement about a horizontal axis or horizontal axes and having brush bristles extending outwardly therefrom along its entire surface, the axis or axes being essentially parallel to the direction of travel of the article conveyor such that the receiving means moves transversely to the direction of travel of the article conveyor,
said receiving means having an upwardly facing portion positioned beneath the egg holders to receive within its brush bristles eggs dropped from the article conveyor, and a receiving station positioned adjacent to said upwardly facing portion of the receiving means downstream from the location where the eggs are dropped thereon to receive eggs which have moved along the receiving means, whereby eggs dropped from the article conveyor fall into the bristles of the upwardly facing portion of the receiving means, which then moves the eggs therealong in a generally horizontal direction to the receiving station.

14. An apparatus according to claim 13, wherein the receiving means is a cylindrical brush, the curved uppermost portion of which forms said upwardly facing portion.

15. An apparatus according to claim 13, wherein the receiving means comprises an endless conveyor having a generally straight upper run which forms said upwardly facing portion.

16. An apparatus according to claim 13, wherein the upwardly facing portion is long enough, in the direction of its travel, to receive at least two eggs, such that a plurality of eggs, carried by the article conveyor, side by side, can be dropped simultaneously into the bristles of the upwardly facing portion of the receiving means.

17. A method for transferring discrete articles from a conveyor to a receiving station, comprising:

conveying two rows of discrete articles along a conveyor side by side in two rows of article holders which are side by side and spaced apart from other article holders in the direction of movement of the conveyor, releasing two articles, one from each row, side by side, simultaneously onto the upwardly facing portion of the receiver, which upwardly facing portion has a resilient structure to resiliently receive the articles and an engaging structure to engage the sides of the articles to assure their movement along the receiver, and moving the upwardly facing portion transversely, relative to the direction of the conveyor, in a generally horizontal direction, to deliver the articles to a receiving station.

18. A method according to claim 17 wherein the receiver has brush bristles which form the resilient structure and the engaging structure which receives the articles.

* * * * *